(12) United States Patent
Watanabe et al.

(10) Patent No.: US 8,045,248 B2
(45) Date of Patent: Oct. 25, 2011

(54) OPTICAL SCANNING DEVICE AND IMAGE FORMING APPARATUS

(75) Inventors: Naoto Watanabe, Kanagawa (JP);
Kenichiro Saisho, Kanagawa (JP);
Yoshinori Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 488 days.

(21) Appl. No.: 12/024,505

(22) Filed: Feb. 1, 2008

(65) Prior Publication Data
US 2008/0218827 A1 Sep. 11, 2008

(30) Foreign Application Priority Data

Mar. 9, 2007 (JP) ................................. 2007-060168
Oct. 3, 2007 (JP) ................................. 2007-259460

(51) Int. Cl.
*G02B 26/08* (2006.01)

(52) U.S. Cl. ............... 359/204.2; 359/204.1; 359/216.1; 359/219.1

(58) Field of Classification Search .... 359/204.1–204.5, 359/216.1–219.2; 347/233, 243, 259–261
See application file for complete search history.

(56) References Cited

U.S. PATENT DOCUMENTS

| | | | |
|---|---|---|---|
| 4,796,961 A * | 1/1989 | Yamada et al. ............ | 359/218.1 |
| 6,462,853 B2 | 10/2002 | Hayashi | |
| 6,587,245 B2 | 7/2003 | Hayashi | |
| 6,657,765 B2 | 12/2003 | Hayashi et al. | |
| 6,757,089 B2 | 6/2004 | Hayashi | |
| 6,768,506 B2 | 7/2004 | Hayashi et al. | |
| 6,771,296 B2 | 8/2004 | Hayashi et al. | |
| 6,771,407 B2 | 8/2004 | Hayashi et al. | |
| 6,788,444 B2 | 9/2004 | Suzuki et al. | |
| 6,803,941 B2 | 10/2004 | Hayashi et al. | |
| 6,903,856 B2 | 6/2005 | Hayashi | |
| 6,906,739 B2 | 6/2005 | Suzuki et al. | |
| 6,934,061 B2 | 8/2005 | Ono et al. | |
| 6,956,685 B2 | 10/2005 | Hayashi | |
| 6,987,593 B2 | 1/2006 | Hayashi et al. | |
| 7,006,120 B2 | 2/2006 | Sakai et al. | |
| 7,050,210 B2 | 5/2006 | Atsuumi et al. | |
| 7,068,296 B2 | 6/2006 | Hayashi et al. | |
| 7,088,484 B2 | 8/2006 | Hayashi et al. | |
| 7,106,483 B2 | 9/2006 | Hayashi et al. | |
| 7,145,705 B2 | 12/2006 | Hayashi | |

(Continued)

FOREIGN PATENT DOCUMENTS

JP 2002-23085 1/2002

(Continued)

OTHER PUBLICATIONS

U.S. Appl. No. 12/174,899, filed Jul. 17, 2008, Saisho, et al.

(Continued)

*Primary Examiner* — James Phan
(74) *Attorney, Agent, or Firm* — Oblon, Spivak, McClelland, Maier & Neustadt, L.L.P.

(57) ABSTRACT

An optical scanning device includes a light source, a light-beam splitting unit, a deflector, and a scanning optical system. The light-beam splitting unit splits a light beam from the light source into a plurality of light beams, so that the light beams are each incident to any one of reflecting surfaces of the deflector while having a phase difference of approximately π/2. The scanning optical system receives the light beams from the deflector and projects each of the light beams onto a corresponding target surface.

14 Claims, 8 Drawing Sheets

U.S. PATENT DOCUMENTS

| | | |
|---|---|---|
| 7,218,432 B2 | 5/2007 | Ichii et al. |
| 7,236,281 B2 | 6/2007 | Hayashi et al. |
| 7,253,937 B2 | 8/2007 | Ueda et al. |
| 7,271,823 B2 | 9/2007 | Izumi et al. |
| 7,271,824 B2 | 9/2007 | Omori et al. |
| 7,471,434 B2 * | 12/2008 | Nakamura et al. ......... 359/203.1 |
| 2003/0053156 A1 | 3/2003 | Satoh et al. |
| 2004/0036936 A1 | 2/2004 | Nakajima et al. |
| 2005/0243396 A1 | 11/2005 | Fujii et al. |
| 2006/0077500 A1 | 4/2006 | Hayashi et al. |
| 2006/0187294 A1 | 8/2006 | Saisho et al. |
| 2006/0232659 A1 | 10/2006 | Hayashi et al. |
| 2006/0245009 A1 | 11/2006 | Akiyama et al. |
| 2006/0284968 A1 | 12/2006 | Hayashi et al. |
| 2007/0058255 A1 | 3/2007 | Imai et al. |
| 2007/0211324 A1 | 9/2007 | Sakai et al. |
| 2007/0211326 A1 | 9/2007 | Saisho et al. |
| 2007/0253048 A1 | 11/2007 | Sakai et al. |
| 2007/0297036 A1 | 12/2007 | Nakamura et al. |

FOREIGN PATENT DOCUMENTS

JP    2006-284822    10/2006

OTHER PUBLICATIONS

U.S. Appl. No. 12/186,808, filed Aug. 6, 2008, Watanabe, et al.

U.S. Appl. No. 12/189,430, filed Aug. 11, 2008, Saisho.

* cited by examiner

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2007-060168 filed in Japan on Mar. 9, 2007 and 2007-259460 filed in Japan on Oct. 3, 2007.

BACKGROUND OF THE INVENTION

1. Field of the Invention

The present invention relates to an optical scanning device and an image forming apparatus including the same.

2. Description of the Related Art

With improvement in colorization and high-speed processing of an electrophotographic image forming apparatus such as a laser printer, a laser plotter, a digital copier, a facsimile machine, and a multifunction product, there has been widely used a tandem-type image forming apparatus including a plurality of (typically four) photosensitive elements as image carriers. For example, in the tandem-type image forming apparatus, four photosensitive elements are arranged along a transfer belt (or intermediate transfer belt) that conveys a recording material. A charging unit charges the photosensitive elements, and then a writing unit forms latent images on the photosensitive elements, one on each of them. A developing unit then develops the latent images using developers of different colors (for example, toner of yellow, magenta, cyan, and black) into visible images. The visible images of different colors are superimposed and transferred onto the recording material conveyed by the transfer belt (or the intermediate transfer belt), so that a color image is formed.

Some electrophotographic color image forming apparatuses that employ a single-drum intermediate transfer system includes only one photosensitive element. In the single-drum intermediate transfer system, a photosensitive element is rotated the number of colors, e.g., four times, per color image, so that images of the colors are sequentially transferred onto an intermediate transfer member as superimposed images. Afterward, the superimposed images are collectively transferred onto a recording material. In such an image forming apparatus, however, it is necessary to rotate the photosensitive element four times for forming a full-color image, which causes lower productivity than the tandem-type image forming apparatus.

Thus, the tandem-type image forming apparatus can achieve a higher processing speed and a higher productivity than the single-drum image forming apparatus. However, in the tandem-type image forming apparatus, a writing unit performs optical writing on a plurality of photosensitive elements by using an optical scanning unit including a light source corresponding to each photosensitive element. For example, four light sources are usually necessary for writing to four photosensitive elements. An increase of the light sources causes an increase of the number of components to be used, color shift due to a wavelength difference between the light sources, and an increase in costs.

Furthermore, deterioration of a laser diode is one of the reasons for malfunction of the writing unit. Therefore, the increase of the light sources causes a higher probability of malfunction of the light source, resulting in a decrease of recyclability.

A conventional technology for decreasing the number of light sources used in the optical scanning device is disclosed in Japanese Patent Application Laid-open No. 2002-23085. A pyramidal mirror or a flat-plate mirror is used to scan a plurality of surfaces to be scanned with light beams emitted from a common light source. Although the conventional technology can reduce the number of light sources, a light beam needs to be deflected by two surfaces of deflecting mirrors, which makes it difficult to perform high-speed processing.

Japanese Patent Application Laid-open No. 2006-284822 discloses a conventional technology for solving the above-describe problem. In an optical scanning device according to the conventional technology, light beams emitted from a light source is split into two light fluxes by a splitting unit such that the two light fluxes is displaced to each other in a sub-scanning direction. The two light fluxes enter a deflecting unit including two polygon mirrors that are aligned at different angles and concentrically rotate. After deflected by the deflecting unit, the two light fluxes are projected onto two different surfaces to be scanned, respectively.

The conventional technology uses the two stages of polygon mirrors for generating phase shift, so that it is possible to scan different surfaces with light beams from a common light source. However, such a polygon mirror is not used for general purpose, thereby causing an increase of costs. Furthermore, high proccessability of the polygon mirror is required. Because surface deviation or surface accuracy of each polygon mirror is different, image quality can be decreased.

SUMMARY OF THE INVENTION

It is an object of the present invention to at least partially solve the problems in the conventional technology.

According to an aspect of the present invention, there is provided an optical scanning device. The optical scanning device includes a light source that emits a light beam modulated based on image data; a deflector that is rotatable and includes a plurality of reflecting surfaces; a light-beam splitting unit that receives the light beam from the light source and splits the light beam into a plurality of light beams such that the light beams having a phase difference of approximately $\pi/2$ are each incident to any one of the reflecting surfaces; and a scanning optical system that guides the light beams from the deflector to a target surface.

According to another aspect of the present invention, there is provided an image forming apparatus. The image forming apparatus includes an image carrier; a writing unit that scans the image carrier with a light beam to form a latent image on the image carrier. The writing unit includes an optical scanning device including a light source that emits a light beam modulated based on image data; a deflector that is rotatable and includes a plurality of reflecting surfaces; a light-beam splitting unit that receives the light beam from the light source and splits the light beam into a plurality of light beams such that the light beams having a phase difference of approximately $\pi/2$ are each incident to any one of the reflecting surfaces; and a scanning optical system that guides the light beams from the deflector to a target surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
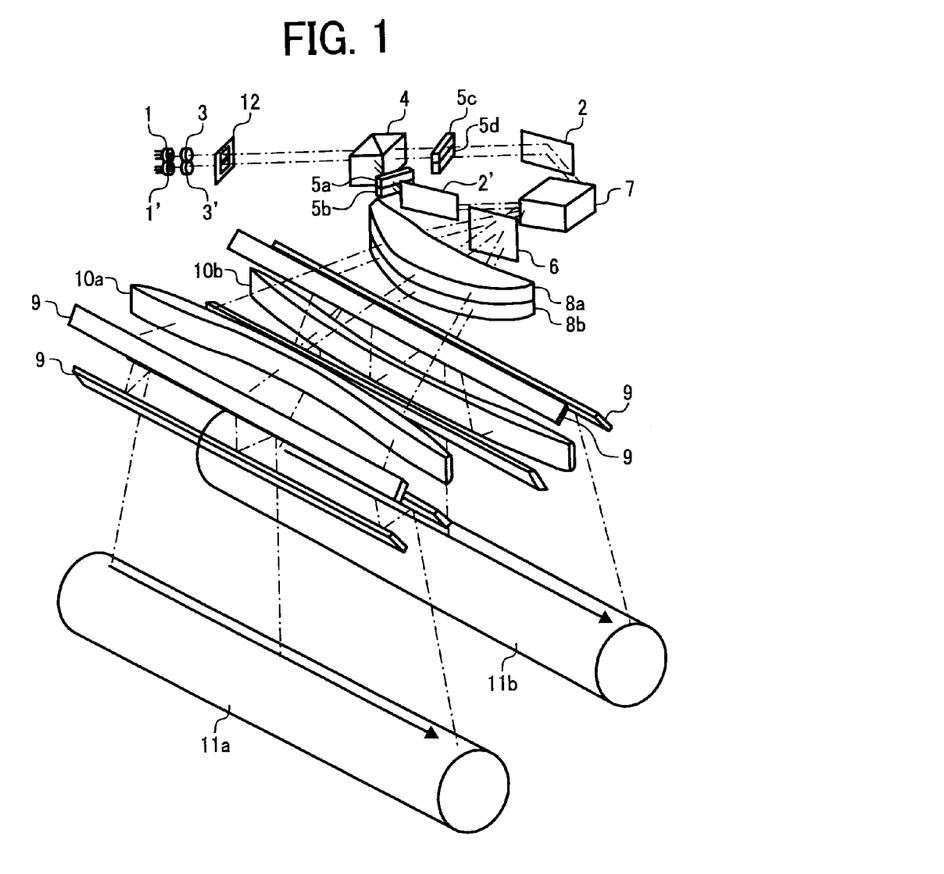
FIG. 1 is a perspective view of an optical scanning device according to a first embodiment of the present invention.

FIG. 1 is a perspective view of an optical scanning device according to a first embodiment of the present invention. The optical scanning device includes laser diodes (LD) 1, 1' as light sources, incidence mirrors 2, 2', coupling lenses 3, 3', a half-mirror prism 4, cylindrical lenses 5a, 5b, 5c, 5d, a soundproof glass 6, a deflector 7, a first scanning lens 8 (8a, 8b), a mirror 9, a second scanning lens 10 (10a, 10b), a photosensitive element 11 (11a, 11b), and an aperture stop 12. The deflector 7 is, for example, a polygon mirror having four reflecting surfaces. The mirror 9 changes an optical path of a light beam by reflecting the light beam. The photosensitive element 11 (11a, 11b) is a surface to be scanned by light beams from the light sources 1, 1'.

A divergent light beam is emitted from each of the light sources 1, 1'. The two divergent light beams are converted into weak convergent light beams, parallel light beams, or weak divergent light beams while passing through the coupling lenses 3, 3'. After being output from the coupling lenses 3, 3', the two converted light beams pass through the aperture stop 12 that shapes beam diameter of the converted light beams. The two converted light beams having a stable beam diameter then enter the half-mirror prism 4. Each of the two converted light beams is split into two light beams by the half-mirror prism 4. Thus, four light beams are output from the half-mirror prism 4. In this case, the light sources 1, 1' are arranged in different positions only in the sub-scanning direction. Therefore, the single half-mirror prism 4 can be used for receiving the two light beams and splitting the two light beams that pass parallel to each other into four light beams.

Figure 2:
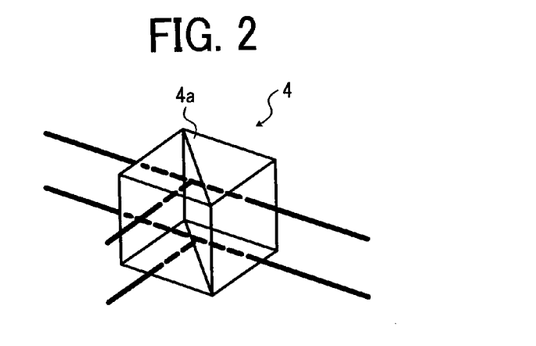
FIG. 2 is a perspective view of a half-mirror prism shown in FIG. 1.

FIG. 2 is a perspective view of the half-mirror prism 4. The half-mirror prism 4 includes a half mirror 4a that splits an incident light beam into two split light beams, that is, a transmitted light beam and a reflected light beam at a sprit ratio of 1:1. The split ratio can be another value, and defined according to other conditions in the optical system.

After passing through the half-mirror prism 4, the four split light beams are projected through the cylindrical lenses 5a, 5b, 5c, and 5d, respectively. The cylindrical lens 5a is laid on the cylindrical lens 5b, and the cylindrical lens 5c is laid on the cylindrical lens 5d. The cylindrical lenses 5a, 5b, 5c, 5d convert the light beams into line images extending in the main scanning direction near reflecting surfaces of the deflector 7.

Although the scanning optical system includes a first scanning optical system and a second scanning optical system that are substantially symmetrically arranged with respect to the deflector 7, only the first scanning optical system (the first scanning lenses 8a, 8b, the mirror 9, and the second scanning lenses 10a, 10b) is shown in FIG. 1. The first scanning optical system scans the photosensitive elements 11a, 11b with light beams. Specifically, each of light beams from the light sources 1, 1' is split into two light beams in two directions by the half-mirror prism 4. One of the split light beams from the light source 1 passes through the cylindrical lens 5a. One of the split light beams from the light source 1' passes through the cylindrical lens 5b. The two split light beams pass through the incidence mirror 2' and then enter one of the reflecting surfaces of the deflector 7. The light beams are deflected by the deflector 7 and then projected through the first scanning optical system. The second scanning optical system has the same configuration as that of the first scanning optical system. Specifically, the other one of the split light beam from the light source 1 and the other one of the split light beam from the light source 1' enter one of the reflecting surfaces of the deflector 7 through the cylindrical lenses 5c, 5d and the incidence mirror 2. The light beams are deflected by the deflector 7 and then projected through the second scanning optical system. In this manner, the second scanning optical system scans photosensitive elements with the light beams.

Figure 3A:
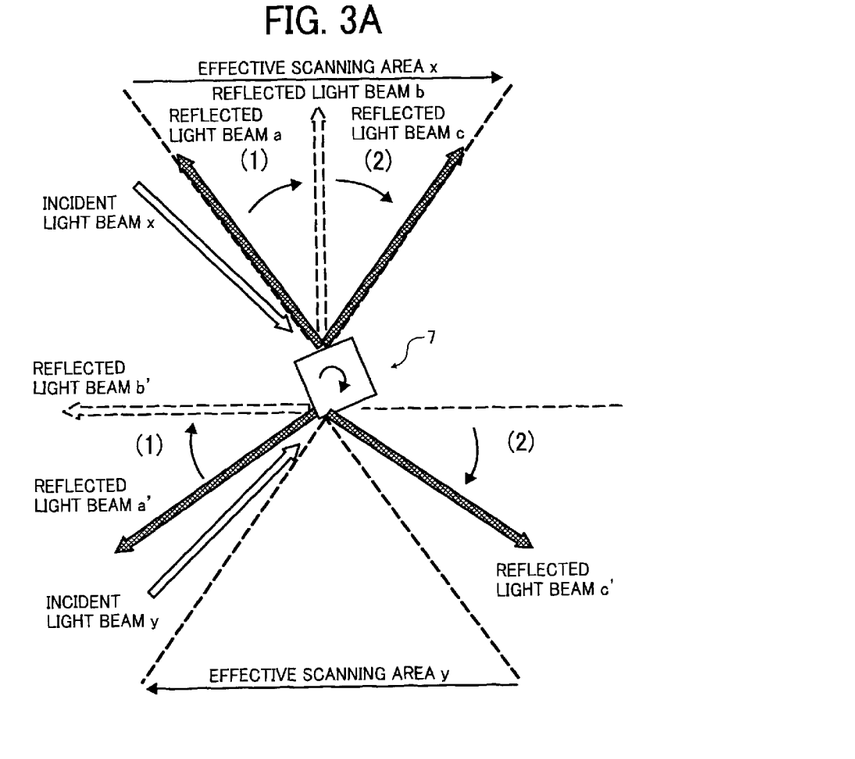
FIGS. 3A to 3D are schematic diagrams for explaining optical scanning by using split light beams.

FIGS. 3A to 3D are schematic diagrams for explaining optical scanning by using split light beams. An incident light beam x and an incident light beam y shown in FIG. 3A are split light beams that are obtained from a single light beam by the half-mirror prism 4. The incident light beam x and the incident light beam y are reflected by the incidence mirrors 2, 2' to adjust optical paths, and then enter different reflecting surfaces of the deflector 7. The incident light beam x and the incident light beam y have a phase difference of approximately π/2 (about 90 degrees) with respect to each other. When having a phase difference of about 90 degrees, the incident light beam x and the incident light beam y do not simultaneously scan an effective scanning area. For example, while a reflected light beam is in an effective scanning area x shown in the upper side of FIG. 3A (i.e., while a reflected light beam shifts from a reflected light beam a to a reflected light beam c though a reflected light beam b), a reflected light beam shown in the lower side of FIG. 3A shifts as described below.

Figure 3B:
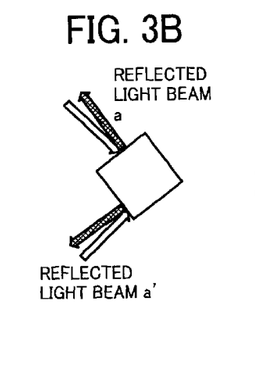
Figure 3C:
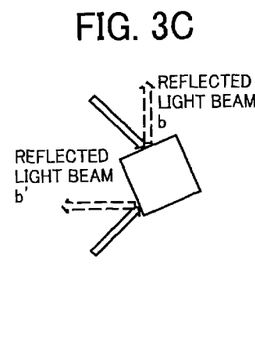
Figure 3D:
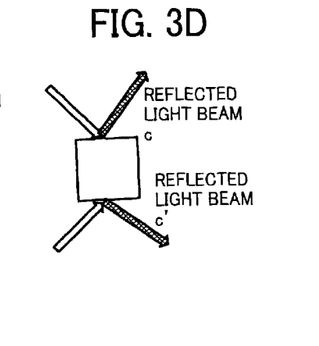

As shown in FIG. 3B, when the incident light beam x is reflected as the reflected light beam a, the incident light beam y is reflected as a reflected light beam a', and, because of the phase difference of about 90 degrees between them, the reflected light beam a' is not in the effective scanning area y. As shown in FIG. 3C, when the deflector 7 is rotated by a certain angle and the incident light beam x is reflected as the reflected light beam b, the incident light beam y is reflected as a reflected light beam b', and the reflected light beam b' is not in the effective scanning area y. As shown in FIG. 3D, when the deflector 7 is further rotated by a certain angle and the incident light beam x is reflected as the reflected light beam c, the incident light beam y is reflected as a reflected light beam c', and the reflected light beam c' is not in the effective scanning area y. That is, the reflected light beams a', b', and c' are not in the effective scanning area y, while the reflected light beams a, b, c are in the effective scanning area x. This relation is obtained under the condition that the incident light beam x and the incident light beam y have a phase difference of about 90 degrees and the deflector 7 has the four reflecting surfaces. Even when the phase difference is not exactly 90 degrees, while a reflected light beam corresponding to the incident light beam x is in the effective scanning area x, a reflected light beam corresponding to the incident light beam y is not in the effective scanning area y, and therefore a surface of the photosensitive element is not scanned with the light beam corresponding to the incident light beam y. When a reflected light beam corresponding to the incident light beam y is in the effective scanning area y, a reflected light beam corresponding to the incident light beam x is not in the effective scanning area x, and therefore a surface of the photosensitive element is not scanned with the light beam corresponding to the incident light beam x. This is because the effective scanning area x and the effective scanning area y are symmetrically arranged with respect to each other.

When a reflected light beam corresponding to the incident light beam x is in the effective scanning area x, the light source emits a modulated light beam based on image data of a corresponding color (for example, magenta). When a reflected light beam corresponding to the incident light beam y is in the effective scanning area y, the light source emits a modulated light beam based on image data of a corresponding color (for example, black). In this manner, the two photosensitive elements can be scanned with the light beams for generating two color images by using the common light source.

Figure 4:
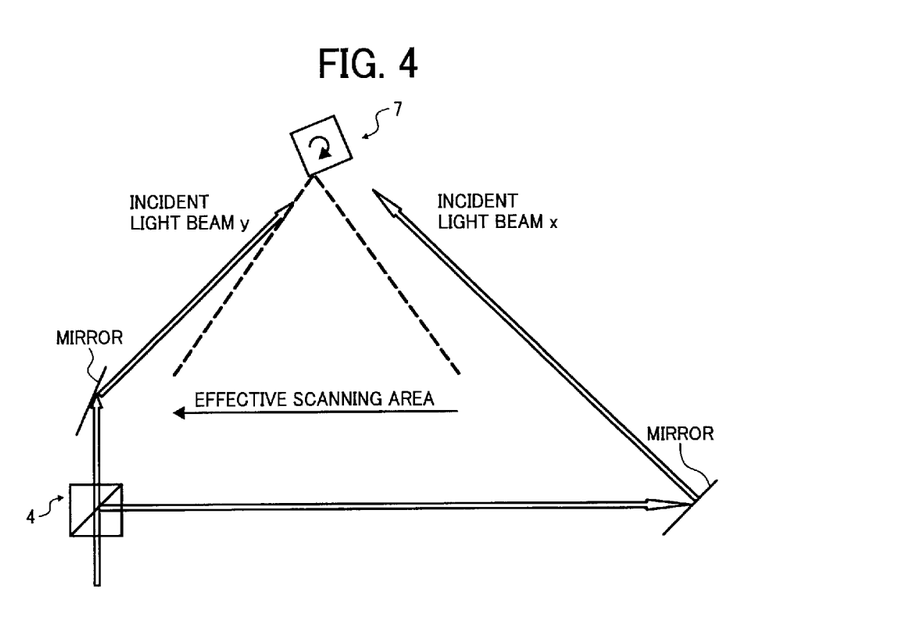
FIG. 4 is a schematic diagram for explaining a case that incident light beams enter the same reflecting surface of a deflector shown in FIG. 1.

FIG. 4 is a schematic diagram for explaining a case that the incident light beams x and y enter the same reflecting surface of the deflector 7. The incident light beam x and the incident light beam y are split light beams that are obtained from a single light beam by the half-mirror prism 4. It is possible that the incident light beam x and the incident light beam y enter the same reflecting surface of the deflector 7. However, in such a case, incident light beams need to pass an effective scanning area and be reflected by a mirror, thereby complicating layout of the optical scanning device. Furthermore, if the incident light beam x and the incident light beam y enter the same reflecting surface of the deflector 7, it is necessary to shift positions of the incident light beam x and the incident light beam y in the sub-scanning direction by using the half-mirror prism 4 and mirrors. For these reasons, as shown in FIGS. 1 and 3A to 3D, it is preferable that the incident light beam x and the incident light beam y enter different reflecting surfaces of the deflector 7 to improve layout of the optical scanning device.

Figure 5:
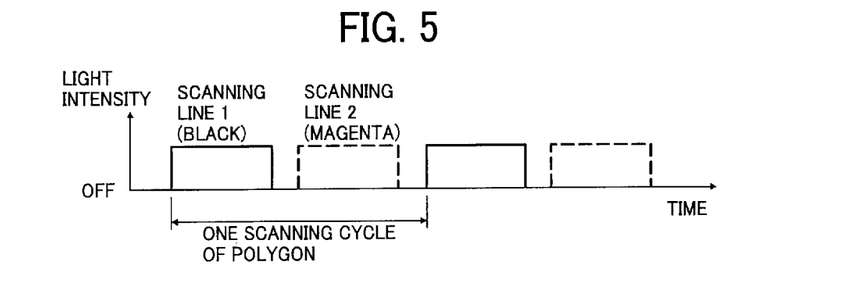
FIG. 5 is a timing chart for explaining exposure with light beams for different colors.

FIG. 5 is a timing chart for explaining exposure with light beams for different colors. In the timing chart, the vertical axis indicates intensity of a light beam, and the horizontal axis indicates exposure time of a light beam. In an example shown in the timing chart, the light beams are deflected by the deflector 7 and projected onto the photosensitive element 11a, 11b (for example, photosensitive elements for black or magenta). Each of the light sources 1, 1' emits a light beam with full intensity in the effective scanning area. Each solid line indicates a portion corresponding to black, and each dotted line indicates a portion corresponding to magenta. A timing for writing each of the black portion and the magenta portion is determined by detecting a scanning light beam by a synchronous detecting unit (synchronous detecting sensor) that is arranged outside the effective scanning area. Although the synchronous detecting unit is not shown in FIG. 1, a light receiving element, such as a photodiode (PD), is usually used as the synchronous detecting unit.

Figure 6:
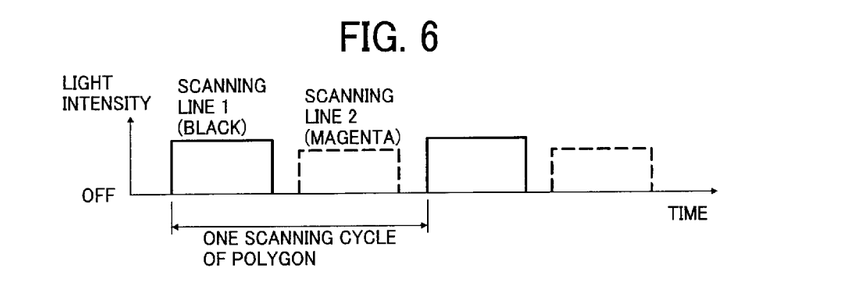
FIG. 6 is a timing chart for explaining exposure with light beams having different intensities for different colors.

FIG. 6 is a timing chart for explaining exposure with light beams having different intensities for different colors. In FIG. 5, the light beams having the same intensity are emitted from the light sources for writing the black portion and the magenta portion. However, each of optical elements used for writing the black portion and the magenta portion have different transmissivity and reflectivity with respect to each other. As a result, when light beams having the same intensity are emitted from the light sources, the light beams reach the photosensitive elements with different intensities. Therefore, as shown in FIG. 6, light beams are set to have different intensities when emitted from the light sources, so that the light beams can reach surfaces of the photosensitive elements with the same intensity.

As shown in FIG. 1, a light beam is emitted from each of the light sources 1, 1' and is split into two light beams by the half-mirror prism 4. One of the split light beams obtained from the light source 1 is projected onto the photosensitive element 11a, and one of the split light beams obtained from the light source 1' is projected onto the photosensitive element 11b. In this manner, two scanning lines for scanning the photosensitive elements 11a, 11b are generated by one-time scanning. It is necessary to adjust a pitch of scanning lines in the sub-scanning direction depending on a density of pixels forming an image. In a commonly used method of adjusting a pitch of scanning lines in the sub-scanning direction, a light source unit (the light sources 1, 1', the coupling lenses 3, 3', and the aperture stop 12) is rotated around an axis that is perpendicular to the main scanning direction and the sub-scanning direction. In this method, it is possible to appropriately adjust the pitch for one photosensitive element, but not for the other photosensitive element because of a pitch error that is caused due to shape error or attachment error of optical elements arranged subsequent to the half-mirror prism 4.

To prevent this problem, it is necessary to arrange a pitch adjusting unit between the half-mirror prism 4 and the deflector 7 to adjust a pitch of scanning lines in the sub-scanning direction.

Figure 7A:
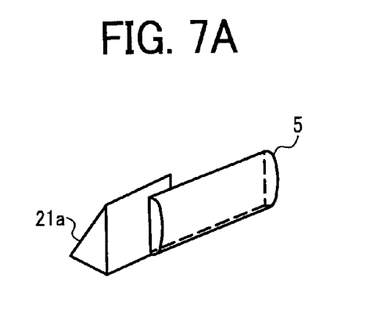
FIGS. 7A and 7B are examples of a pitch adjusting unit according to the first embodiment.
Figure 7B:
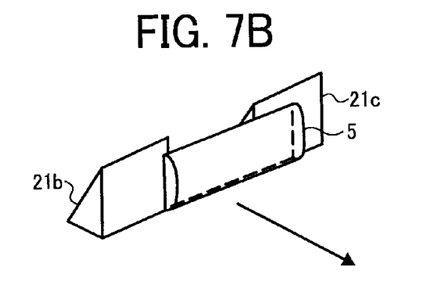

FIG. 7A is an example of the pitch adjusting unit for adjusting one side of the cylindrical lens 5, and FIG. 7B is an example of the pitch adjusting unit for adjusting both sides of the cylindrical lens 5.

For example, the pitch adjusting unit is attached to the cylindrical lens 5 (i.e., the cylindrical lenses 5a, 5b, 5c, 5d) that is arranged between the half-mirror prism 4 and the deflector 7.

The cylindrical lens 5 is attached to a housing (not shown) of the optical scanning device through an intermediate member 21a or 21b and 21c. A curing resin (for example, a light curing resin) is applied in advance to attachment surfaces of the cylindrical lens 5 and the intermediate member 21a or 21b and 21c. The intermediate member 21a or 21b and 21c can be adjusted with respect to the housing for displacement around an axis parallel to the main scanning direction, and a position in an optical axis direction. The cylindrical lens 5 can be adjusted with respect to the intermediate member 21a or 21b and 21c for displacement around an axis parallel to an optical axis, and a position in the sub-scanning direction. At least one of directions to be adjusted for the intermediate member 21a or 21b and 21c with respect to the housing is different from at least one of directions to be adjusted for the cylindrical lens 5 with respect to the intermediate member 21a or 21b and 21c.

With this configuration, it is possible to simultaneously obtain a plurality of optical characteristics (to increase a beam waist diameter, reduce positional deviation of a beam waist, or reduce positional deviation of a beam spot). Moreover, the cylindrical lens 5 can be adjusted for displacement around an axis parallel to the optical axis, so that a pitch of scanning lines can be appropriately determined in the sub-scanning direction. Furthermore, the intermediate member 21a has flat surfaces to which the cylindrical lens 5 and the housing are attached, thereby allowing easy adjustment. When the adjustment between the intermediate member 21a or 21b and 21c and the housing and between the cylindrical lens 5 and the intermediate member 21a or 21b and 21c are completed, the applied curing resin is hardened by a predetermined method (for example, applying ultraviolet irradiation), thereby fixing positions of the intermediate member 21a, the cylindrical lens 5, and the housing.

Figure 8A:
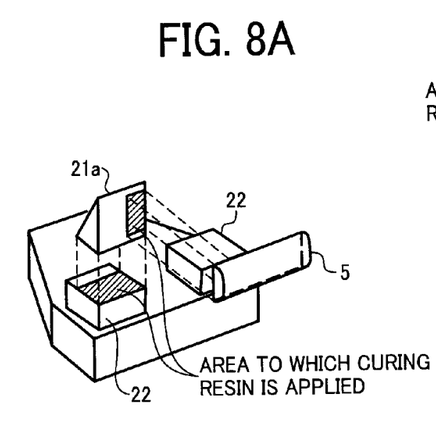
FIGS. 8A and 8B are examples of the pitch adjusting unit and relevant members.
Figure 8B:
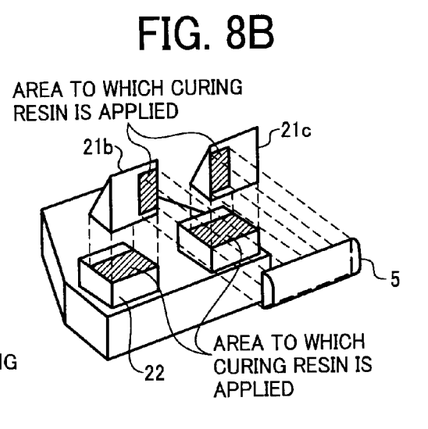

FIGS. 8A and 8B are schematic diagrams of the cylindrical lens 5 and relevant members for adjusting the scanning-line pitch. In an example shown in FIG. 8A, one end of the cylindrical lens 5 is fixed. In another example shown in FIG. 8B, both ends of the cylindrical lens 5 are fixed.

The cylindrical lens 5 is held by a jig and moved to a desired direction (a position in the optical axis direction, displacement around an axis parallel to the optical axis, and a position in the sub-scanning direction). Afterward, the intermediate member 21a (21b, 21c) having a curing resin (for example, an ultraviolet curing resin) applied thereto is pressed against the cylindrical lens 5 and a base 22 of the housing. An ultraviolet ray is then irradiated to fix the cylindrical lens 5. With this simple configuration, the adjustment can be performed in a plurality of directions. If the intermediate member 21a (21b, 21c) is made of a transparent material, it is easier to fix the cylindrical lens 5 by using the ultraviolet curing resin.

As shown in FIG. 7A, an optical element, such as the cylindrical lens 5, can be held by one intermediate member 21a. It is also possible that the cylindrical lens 5 is held by the intermediate members 21b and 21c that are arranged on opposing sides with a light beam passing therebetween. With this configuration, stress is applied to the optical element symmetrically with respect to the optical axis when a temperature increases. Therefore, a change in the position of the optical element can be reduced, even if the housing and the intermediate member 21 (assuming that the intermediate member 21 is made of a resin) have different coefficients of linear expansion.

The laser diode for use in an image forming apparatus is usually subjected to auto power control (APC) for stable optical output. The APC is performed by monitoring optical output power of the laser diode by using a light receiving element, such as a photodiode (PD), and controlling a forward-direction current of the laser diode to a desired value based on a detection signal indicative of a current of a received light beam that is proportional to optical output power of the laser diode.

In most of edge-emitting laser diodes used in an image forming apparatus, a photodiode is used as the light receiving element for monitoring a light beam that is output in a direction reverse to the direction of a light beam output to the coupling lens. However, when a ghost light occurs during the APC, the intensity of a light beam detected by the light receiving element increases.

Assume that the APC is performed when a light beam enters a reflecting surface of the deflector 7 with an incident angle of zero. Because the reflecting surface of the deflector 7 faces the direction of the light source, a light beam emitted from the light source is reflected by the reflecting surface and returns to the light source, thereby increasing an intensity of the light beam detected by the light receiving element. For this reason, the APC is not performed when an incident angle is zero. In this manner, an image can be output with appropriate density and density variation reduced.

Figure 9:
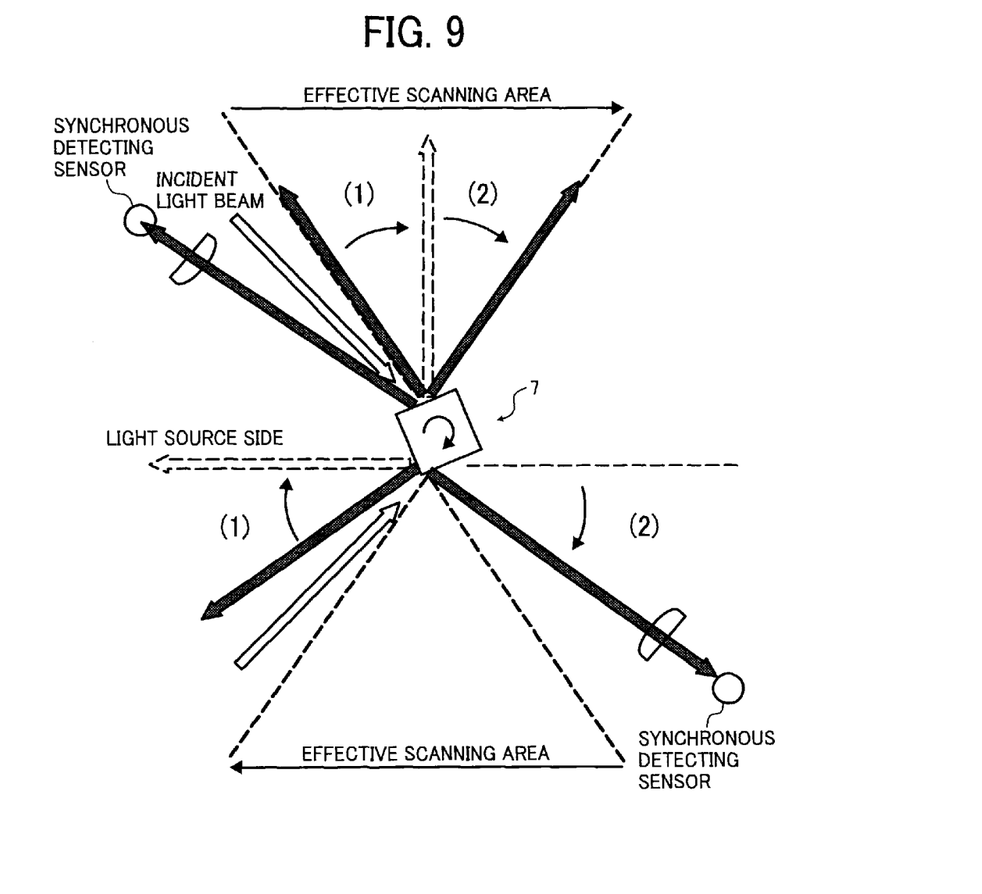
FIG. 9 is a schematic diagram for explaining arrangement of a synchronous detecting sensor according to an embodiment of the present invention.

FIG. 9 is a schematic diagram for explaining arrangement of the synchronous detecting sensor. As shown in the lower side of FIG. 9, it is possible to detect a scanning light beam on a side away from the light source by using a synchronous detecting sensor, such as a photodiode, that is arranged outside an effective scanning area. However, it is difficult to arrange a synchronous detecting sensor on a side closer to the light source because an incident light beam passes near an effective scanning area. Therefore, as shown in the upper side of FIG. 9, the synchronous detection is performed by detecting a reflected light beam that is located on the light-source side with respect to an incident light beam.

In addition to the above method, the synchronous detection can be performed based on optical output power detected by the light receiving element for the APC when an incident light beam enters a reflecting surface of the deflector 7 with an incident angle of zero. Specifically, when the incident angle is zero, a light beam emitted from the laser diode is reflected by a reflecting surface of the deflector 7 and returns directly to the laser diode. The light receiving element for the APC detects the reflected light beam that returns to the laser diode, and uses a signal generated by the reflected light beam as a signal for the synchronous detection. By the synchronous detection using the light receiving element for the APC, it is possible to reduce the number of sensors for the synchronous detection, the number of components, and costs for the synchronous detection.

An integrated surface-emitting laser diode can be used as the light source used in the optical scanning device according to the first embodiment. For example, when a surface-emitting laser diode having 40 channels is used as the light source, light beams can be obtained from the 40 channels for four colors by using two light sources. Thus, it is possible to reduce costs of light sources while maintaining high-speed writing operation.

As described above, in the optical scanning device according to the first embodiment, the half-mirror prism 4 is arranged between the light sources 1, 1' and the deflector 7. The half-mirror prism 4 splits a light beam from each of the light sources 1, 1', so that two light beams having a phase difference of approximately $\pi/2$ (about 90 degrees) are each incident to any one of reflecting surfaces of the deflector 7. Thus, it is possible to scan different surfaces by using a single light source. As a result, the optical scanning device can achieve high-speed writing operation and reduce costs by decreasing the number of light sources.

In the first embodiment, however, an incident light beam enters a reflecting surface of the deflector 7 with an incident angle of $\pi/4$. Such a small incident angle makes it difficult to separate an incident light beam from a scanning light beam (reflected light beam). Therefore, an optical scanning device according to a second embodiment of the present invention can separate an incident light beam from a scanning light beam in an improved manner while maintaining high-speed and high-grade image output.

Figure 11:
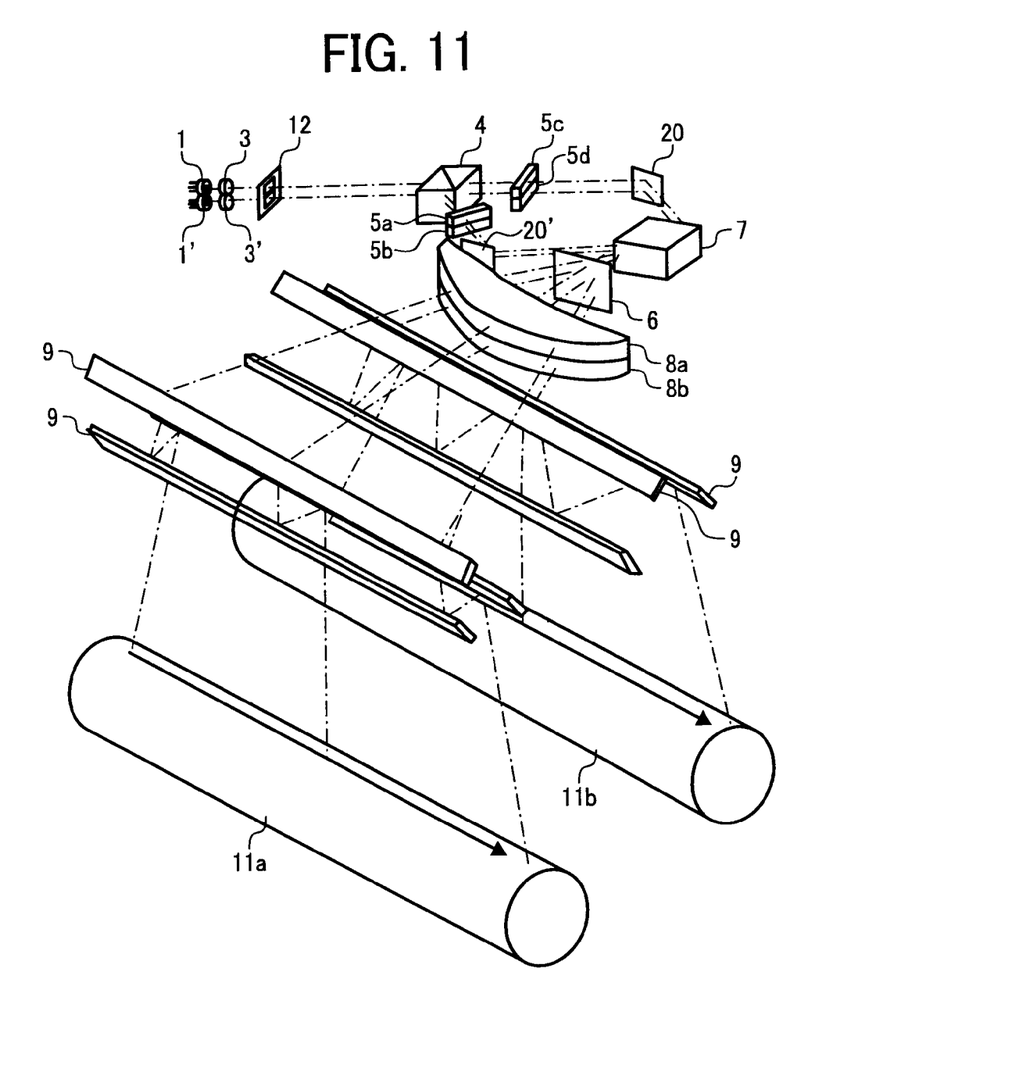
FIG. 11 is a schematic perspective view of an optical scanning device according to a second embodiment of the present invention.

FIG. 11 is a perspective view of an optical scanning device according to the second embodiment of the present invention. In the optical scanning device, the half-mirror prism 4 is arranged between the light sources 1, 1' and the deflector 7. The half-mirror prism 4 receives a light beam emitted from each of the light sources 1, 1', and splits the light beam into two light beams so that the light beams having a phase difference of approximately π/2 (about 90 degrees) are incident to the deflector 7. The deflector 7 has the four reflecting surfaces. An incidence mirror 20' is arranged at substantially the same position as the first scanning lens 8 (8a, 8b). The incidence mirror 20' is used to determine an incident angle at which an incident light beam enters the deflector 7.

Although the second scanning lens 10 (10a, 10b) are not shown in FIG. 11, the optical scanning device in the second embodiment has the same basic configuration as that in the first embodiment.

Although the scanning optical system includes a first scanning optical system and a second scanning optical system that are substantially symmetrically arranged with respect to the deflector 7, only the first scanning optical system is shown in FIG. 11. The first scanning optical system scans the photosensitive elements 11a, 11b with light beams. Specifically, each of light beams from the light sources 1, 1' is split into two light beams in two directions by the half-mirror prism 4. One of the split light beams obtained from the light source 1 passes through the cylindrical lens 5a. One of the split light beams obtained from the light source 1' passes through the cylindrical lens 5b. The two split light beams pass through the incidence mirror 20' and then enter one of the reflecting surfaces of the deflector 7. The light beams are deflected by the deflector 7 and then projected through the first scanning optical system. The second scanning optical system has the same configuration as that of the first scanning optical system. Specifically, the other one of the split light beam from the light source 1 and the other one of the split light beam from the light source 1' enter one of the reflecting surfaces of the deflector 7 through the cylindrical lenses 5c, 5d and the incidence mirror 20. The light beams are deflected by the deflector 7 and then projected through the second scanning optical system. In this manner, the second scanning optical system scans photosensitive elements (not shown) with the light beams. The incidence mirror 20 is arranged at substantially the same position as a scanning lens (not shown) in the second scanning optical system.

Figure 12:
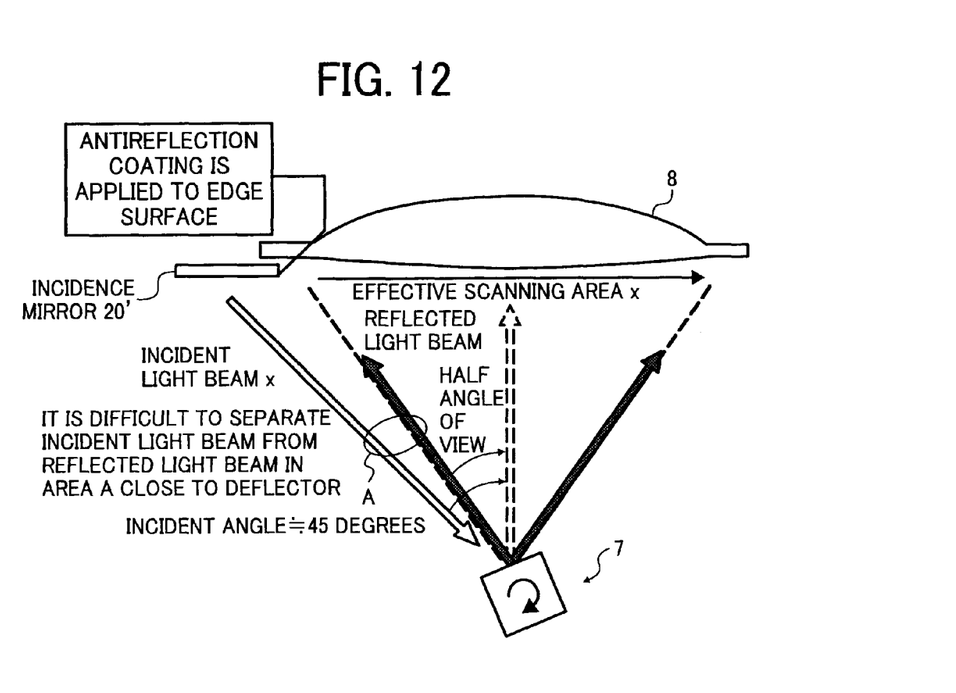
FIG. 12 is a schematic diagram for explaining a relation between an incident light beam and a scanning light beam.

FIG. 12 is a schematic diagram for explaining a relation between an incident light beam and a scanning light beam (reflected light beam).

In a general optical system, an incident angle (an angle defined by a direction perpendicular to a surface to be scanned and a direction from which a light beam enters) is in the range from about 55 degrees to about 70 degrees. In the embodiments, however, an incident angle is 45 degrees because the light beams have a phase difference of 90 degrees. In a general scanning optical system, a half angle of view is in the range from about 35 degrees to about 40 degrees. An angle defined by an incident light beam and a scanning light beam located closest to the incident light beam, i.e., a difference between an incident angle and a half angle of view is in the range from 15 degrees to 35 degrees. However, in the embodiments, the difference between an incident angle and a half angle of view is in the range from 5 degrees to 10 degrees. The incident light beam and the scanning light beam need to be separated from each other in such a small angle difference.

As shown in FIG. 12, because an angle difference between an incident light beam and a scanning light beam is small, it is difficult to separate the incident light beam from the scanning light beam in an area A that is located close to the deflector 7. If the incidence mirror 20' is arranged close to the deflector 7, a scanning light beam can be blocked by the incidence mirror 20'.

To prevent the above problem, the incidence mirror 20' is arranged at substantially the same position as the first scanning lens 8 (8a, 8b) that is located farthest from the deflector 7, so that the incident light beam can enter the deflector 7 without being blocked by the incidence mirror 20'. In this case, if the incidence mirror 20' is arranged in contact with a part of the first scanning lens 8 (8a, 8b), alignment and mounting of the incidence mirror 20' can be facilitated.

When a scanning light beam enters an edge surface of the incidence mirror 20' and is reflected by the edge surface, the reflected light beam enters the effective scanning area as a ghost light, thereby causing an undesired line in an image. Therefore, it is preferable that antireflection coating is applied to an edge surface of the incidence mirror 20'.

Figure 13:
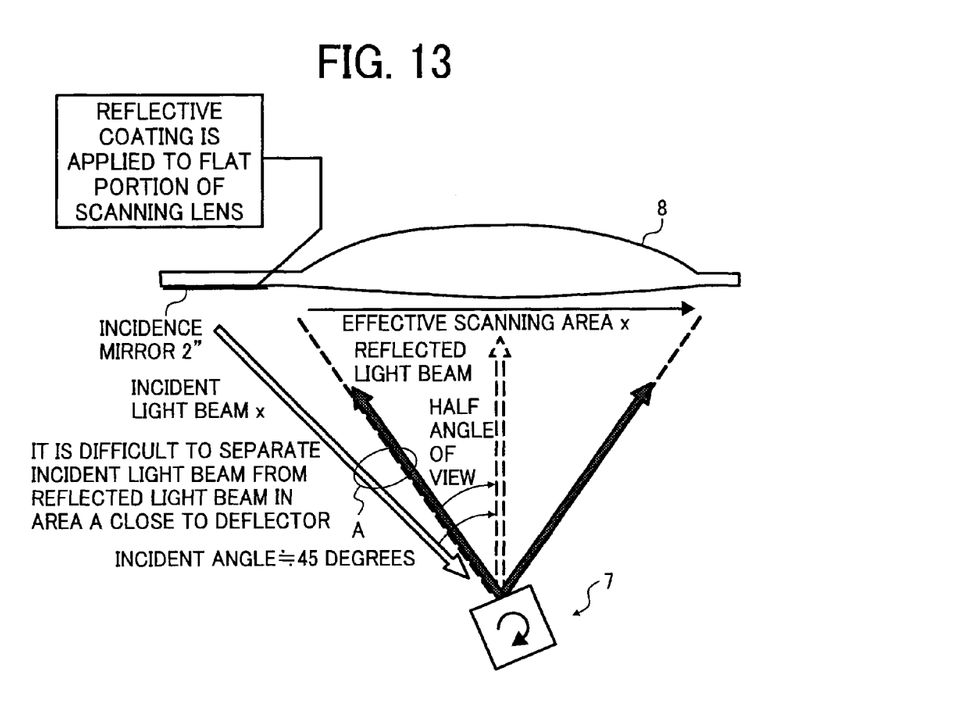
FIG. 13 is a schematic diagram for explaining an example that a reflective coating portion is formed on a part of a first scanning lens shown in FIG. 1.

FIG. 13 is a schematic diagram for explaining an example that a reflective coating portion 2" is formed on a part of the first scanning lens 8 instead of arranging the incidence mirror 20'. A flat portion is formed on the side of the first scanning lens 8 (8a, 8b) to which an incident light beam enters (near an intersection of the first scanning lens 8 (8a, 8b) and the incident light beam), and reflective coating is applied to the flat portion to form the reflective coating portion 2". An incident light beam is reflected by the reflective coating portion 2" and is projected onto the deflector 7. In this case, the reflective coating portion 2" functions as the incidence mirror 20', so that it is not necessary to arrange the incidence mirror 20' separately. Thus, it is possible to reduce costs of the optical scanning device.

The incidence mirror 20 is configured in the same manner as the incidence mirror 20' as described above.

As described above, in the optical scanning device according to the second embodiment, each of the incidence mirrors 20, 20' is arranged on substantially the same position as the first scanning lens. Alternatively, the flat portion is formed on the side of the first scanning lens to which the incident light beam enters. The reflective coating is applied to the flat portion to form the reflective coating portion 2". Thus, the incident light beam is reflected by the reflective coating portion 2" and is projected onto the deflector 7. Otherwise, the optical scanning device in the second embodiment is basically similar to that in the first embodiment described with reference to FIGS. 2 to 9, and the same description is not repeated.

Figure 10:
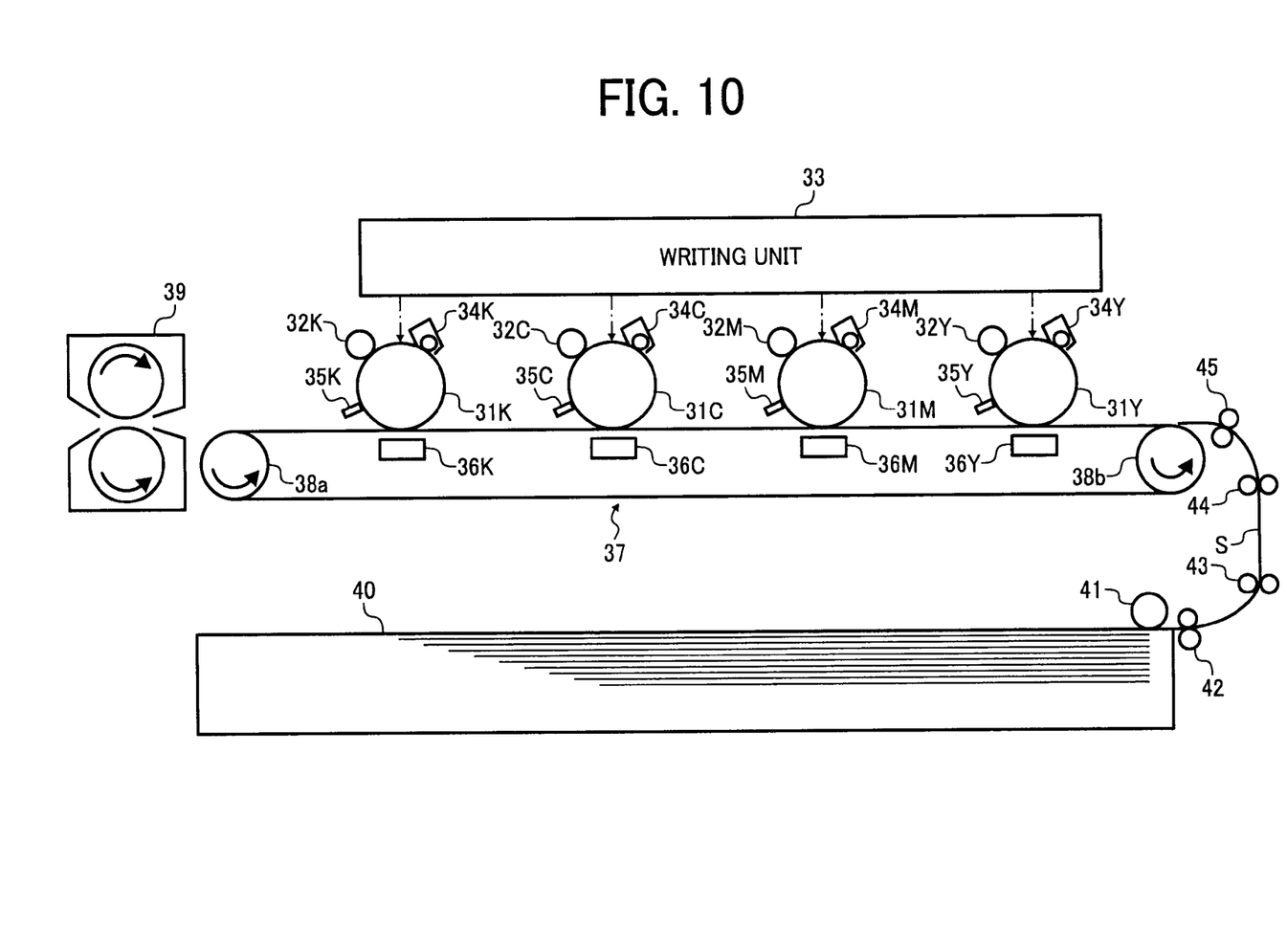
FIG. 10 is a schematic diagram of a multicolor image forming apparatus including the optical scanning device according to the embodiment.

FIG. 10 is a schematic diagram of a multicolor image forming apparatus including the optical scanning device according to the embodiments. The image forming apparatus includes a photosensitive element 31 (31Y, 31M, 31C, and 31K), a charging device 32 (32Y, 32M, 32C, 32K), a writing unit 33, a developing device 34 (34Y, 34M, 34C, 34K), a cleaning unit 35 (35Y, 35M, 35C, 35K), a charging unit 36 (36Y, 36M, 36C, 36K), a transfer belt 37, a driving roller 38a, a driven roller 38b, a fixing unit 39, a feeding cassette 40, a feeding roller 41, a separation roller 42, conveying rollers 43, 44, and a registration roller 45. The charging device 32 charges the photosensitive element 31. The writing unit 33 includes the above-described optical scanning device in which the charged photosensitive element 31 is irradiated with a light beam that is modulated based on an image signal, so that an electrostatic latent image is formed on the photosensitive element 31. The developing device 34 develops the latent image formed on the photosensitive element 31 into a visible image (toner image) by using toner of each color. The cleaning unit 35 removes toner remaining on a surface of the photosensitive element 31 after transfer of the toner image. The charging unit 36 causes the toner image formed on the photosensitive element 31 to be transferred onto a recording material. The transfer belt 37 supports and conveys the recording material. The driving roller 38a and the driven roller 38b support the transfer belt 37. The fixing unit 39 fixes the toner image onto the recording material. The feeding cassette 40 contains sheet-shaped recording material (recording sheets) S. The feeding roller 41 feeds the recording sheets S. The separation roller 42 separates the recording sheets S fed by the feeding roller 41 one by one. The conveying rollers 43, 44 convey the recording sheets S. The registration roller 45 conveys each of the recording sheets S to the transfer belt 37 at the timing for forming an image on the photosensitive element 31. Reference marks Y, M, C, and K attached to the reference numerals indicate colors yellow, magenta, cyan, and black, respectively.

The photosensitive elements 31Y, 31M, 31C, and 31K are arranged along the transfer belt 37 and are rotated clockwise. Around the photosensitive elements 31Y, 31M, 31C, and 31K are arranged the charging devices 32Y, 32M, 32C, 32K, the developing devices 34Y, 34M, 34C, 34K, the charging units 36Y, 36M, 36C, 36K, and the cleaning units 35Y, 35M, 35C, 35K, respectively.

The charging devices 32Y, 32M, 32C, 32K uniformly charge surfaces of the photosensitive elements 31Y, 31M, 31C, 31K. The charging device 32 is, for example, a roller-shaped or brush-shaped charging member that is of a contact charging type, or a charger of a noncontact charging type. The writing unit 33 projects a light beam on a surface of each of the photosensitive elements 31Y, 31M, 31C, 31K. The surfaces onto which the light beams are projected are located between the charging devices 32Y, 32M, 32C, 32K and the developing devices 34Y, 34M, 34C, 34K. In this manner, an electrostatic latent image is formed on each of the photosensitive elements 31Y, 31M, 31C, 31K. The electrostatic latent images are developed by the developing devices 34Y, 34M, 34C, 34K, so that toner images of the colors Y, M, C, K are formed on the photosensitive elements 31Y, 31M, 31C, 31K. The charging units 36Y, 36M, 36C, 36K cause the toner images of the colors Y, M, C, K to be sequentially superimposed and transferred onto the recording sheet S conveyed by the transfer belt 37. Afterward, the fixing unit 39 fixes the image onto the recording sheet S.

Although the photosensitive elements 11a, 11b of the optical scanning device are shown in FIG. 1 (FIG. 11), the writing unit 33 includes the four photosensitive elements 31Y, 31M, 31C, 31K. As described in the first and second embodiments, the optical scanning device includes the first scanning optical system and the second scanning optical system. The first scanning optical system and the second scanning optical system have the same configuration and are arranged in substantially symmetrical with respect to the deflector 7. Thus, it is possible to perform optical scanning corresponding to each of the photosensitive elements 31Y, 31M, 31C, 31K.

The optical systems of the optical scanning devices shown in the first embodiment (FIG. 1) and the second embodiment (FIG. 11) are implemented based on the following data:

Wavelength of each of the light sources 1, 1': 655 nanometers

Focal length of each of the coupling lenses 3, 3': 15 millimeters

Effect of coupling: collimating

Polygon mirror 7

Number of reflecting surfaces: 4

Inscribed circle radius: 7 millimeters

The cylindrical lenses 5, 5' each having a focal length of 110 millimeters are arranged between the half-mirror prism 4 and the deflector (polygon mirror) 7. The cylindrical lenses 5, 5' generate line images extending in the main scanning direction at the vicinity of the reflecting surfaces of the deflector 7.

Data about lenses to be arranged downstream of the deflector 7 is described below.

A first surface of each of the first scanning lenses 8a, 8b, and both surfaces of each of the second scanning lenses 10a, 10b are defined by following Equations 1 and 2.

Equation for non-arc shape in the main scanning direction

A surface of the lens has a non-arc shape in the main scanning direction. A depth X in the optical axis direction is defined by the following Equation:

$$X = (Y^2/Rm)/[1+\sqrt{\{1-(1+K)(Y/Rm)2\}} + A1 \cdot Y + A2 \cdot Y^2 + A3 \cdot Y^3 + A4 \cdot Y^4 + A5 \cdot Y^5 + A6 \cdot Y^6 + \quad (1)$$

where Rm is a paraxial curvature radius in the main scanning direction around an optical axis, Y is a distance from the optical axis in the main scanning direction, K is a conical constant, A1, A2, A3, A4, A5, A6, ... are higher-order coefficients.

When a numerical value other than zero is substituted for the odd-order coefficients A1, A3, A5, ..., the surface has an asymmetric shape in the main scanning direction.

In the embodiments, the even-order coefficients are used for the substitution, and thereby the shape has a symmetric shape in the main scanning direction.

Equation for curvature in the sub-scanning direction

A change of a curvature in the sub-scanning direction according to the main scanning direction is defined by the following Equation 2:

$$Cs(Y) = 1/Rs(0) + B1 \cdot Y + B2 \cdot Y^2 + B3 \cdot Y^3 + B4 \cdot Y^4 + B5 \cdot Y^5 + \quad (2)$$

When a numerical value other than zero is substituted for the odd-order coefficients B1, B3, B5, ... of Y, a curvature radius in the sub-scanning direction is asymmetric to the main scanning direction.

A second surface of the first scanning lens is a rotationally symmetric aspheric, and is defined by Equation 3.

Rotationally symmetric aspheric surface

A depth X in the optical axis direction is defined by polynomial Equation 3:

$$X = (Y^2/R)/[1+\sqrt{\{1-(1+K)(Y/Rm)2\}} + A1 \cdot Y + A2 \cdot Y^2 + A3 \cdot Y^3 + A4 \cdot Y^4 + A5 \cdot Y^5 + A6 \cdot Y^6 + \quad (3)$$

Where R is a paraxial curvature radius around an optical axis, Y is a distance from the optical axis in the main scanning direction, K is a conical constant, and A1, A2, A3, A4, A5, A6, ... are higher-order coefficients.

A shape of the first surface of the first scanning lens is defined as follows:

$Rm = -279.9, Rs = -61.0$ $K = -2.900000E+01$ $A4 = 1.755765E-07$ $A6 = -5.491789E-11$ $A8 = 1.087700E-14$ $A10 = -3.183245E-19$ $A12 = -2.635276E-24$ $B1 = -2.066347E-06$ $B2 = 5.727737E-06$ $B3 = 3.152201E-08$ $B4 = 2.280241E-09$ $B5 = -3.729852E-11$ $B6 = -3.283274E-12$ $B7 = 1.765590E-14$ $B8 = 1.372995E-15$ $B9 = -2.889722E-18$ $B10 = -1.984531E-19$ where "E+01" means "*10^{01}", and "E−07" means "*10^{−07}". The following equations also use "E+01" and "E−07" in the same manner.

A shape of the second surface of the first scanning lens is defined as follows:

$R = -83.6$ $K = -0.549157$ $A4 = 2.748446E-07$ $A6 = -4.502346E-12$ $A8 = -7.366455E-15$ $A10 = 1.803003E-18$ $A12 = 2.727900E-23$

A shape of the first surface of the second scanning lens is defined as follows:

Rm=6950, Rs=110.9

$K = 0.000000+00$ $A4 = 1.549648E-08$ $A6 = 1.292741E-14$ $A8 = -8.811446E-18$ $A10 = -9.182312E-22$ $B1 = -9.593510E-07$ $B2 = -2.135322E-07$ $B3 = -8.079549E-12$ $B4 = 2.390609E-12$ $B5 = 2.881396E-14$ $B6 = 3.693775E-15$ $B7 = -3.258754E-18$ $B8 = 1.814487E-20$ $B9 = 8.722085E-23$ $B10 = -1.340807E-23$

A shape of the second surface of the second scanning lens is defined as follows:

Rm=766, Rs=−68.22

$K = 0.000000+00$ $A4 = -1.150396E-07$ $A6 = 1.096926E-11$ $A8 = -6.542135E-16$ $A10 = 1.984381E-20$ $A12 = -2.411512E-25$ $B2 = 3.644079E-07$ $B4 = -4.847051E-13$ $B6 = -1.666159E-16$ $B8 = 4.534859E-19$ $B10 = -2.819319E-23$ where a refractive index of the scanning lens with a wavelength to be used is 1.52724.

The optical system is arranged in the manner as follows:

A distance d1 from the reflecting surface of the deflector to the first surface of the first scanning lens: 64 millimeters A center thickness d2 of the first scanning lens: 22.6 millimeters A distance d3 from the second surface of the first scanning lens to the first surface of the second scanning lens: 75.9 millimeters A center thickness of the second scanning lens: 4.9 millimeters A distance d5 from the second surface of the second scanning lens to the scanned surface: 158.7 millimeters The soundproof glass 6 and a dustproof glass (not shown) each having a refractive index of 1.514 and a thickness of 1.9 millimeters are arranged in the optical scanning device shown in FIG. 1. The soundproof glass 6 is arranged with a tilt angle of 10 degrees with respect to a direction parallel to the main scanning direction in a deflection and rotation area, so that a ghost light can be prevented.

Although not shown, the dustproof glasses are arranged between the second scanning lenses 10*a*, 10*b* and the scanned surfaces (photosensitive elements) 11*a*, 11*b*.

As set forth hereinabove, according to an aspect of the present invention, different surfaces can be scanned with light beams emitted from a single light source. That is, while maintaining high-speed writing operation, the number of light sources can be reduced. Additionally, the number of synchronous detecting units can also be reduced, which results in less cost.

Moreover, an incident light beam can be separated from a scanning light beam in an improved manner. Besides, it is possible to improve flexibility in design layout.

Furthermore, it is possible to adjust a pitch of scanning lines in the sub-scanning direction with high accuracy. In addition, light intensity of each color can be adjusted, so that high-quality image can be output with high reproducibility of the colors.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
    a light source that emits a light beam modulated based on image data;
    a deflector that is rotatable and includes four reflecting surfaces;
    a light-beam splitting unit that receives the light beam from the light source and splits the light beam into a plurality of light beams such that one of the plurality of light beams is incident to one of the reflecting surfaces and another of the plurality of light beams is incident to another of the reflecting surfaces; and a first scanning optical system that receives light beams from the one of the reflecting surfaces; and a second scanning optical system that receives light beams from the other of the reflecting surfaces, wherein when one of the first scanning optical system and the second scanning optical system guides respective light beams from a corresponding one of the reflecting surfaces to a target surface, the other of the first scanning optical system and the second scanning optical system does not guide light beams from the other of the reflecting surfaces to the target surface.

2. The optical scanning device according to claim 1, wherein the light beams enter different reflecting surfaces of the deflector.

3. The optical scanning device according to claim 1, further comprising incidence mirrors, each of which determines an incident angle at which each of the light beams enters the deflector, wherein each of the first scanning optical system and the second scanning optical system includes a scanning lens that is arranged at a substantially same position as each of the incidence mirrors.

4. The optical scanning device according to claim 3, wherein the incidence mirror is in contact with part of the scanning lens.

5. The optical scanning device according to claim 3, wherein antireflection coating is applied to an edge surface of the incidence mirror.

6. The optical scanning device according to claim 1, wherein each of the first scanning optical system and the second scanning optical system includes a scanning lens that has a flat portion near an intersection of the scanning lens and a light beam, and reflective coating is applied to the flat portion to reflect the light beam to one of the reflecting surfaces of the deflector.

7. The optical scanning device according to claim 1, further comprising synchronous detecting units, each of which is arranged opposite to a corresponding one of the first scanning optical system and the second scanning optical system with respect to a light beam that enters the deflector.

8. The optical scanning device according to claim 1, further comprising a light receiving unit that controls light intensity of the light source, wherein the light receiving unit synchronously detects light beams passing through an area on a side of the light source.

9. The optical scanning device according to claim 1, further comprising a pitch adjusting unit that adjusts a pitch between a plurality of scanning lines that are formed on the target surface, the pitch being a scanning-line interval in a sub-scanning direction, wherein the pitch adjusting unit is arranged between the light-beam splitting unit and the deflector.

10. The optical scanning device according to claim 1, wherein the light source includes a plurality of light sources, and the light sources are arranged in different positions in a sub-scanning direction.

11. The optical scanning device according to claim 1, wherein the light source emits the light beam at various intensity depending on the target surface.

12. The optical scanning device according to claim 1, wherein the light source is a surface-emitting laser diode.

13. The optical scanning device according to claim 1, wherein an angle between the one of the plurality of light beams that is incident to the one of the reflecting surfaces and the other of the plurality of light beams that is incident to the other of the reflecting surfaces is approximately 90 degrees.

14. The optical scanning device according to claim 1, wherein the light-beam splitting unit receives the light beam from the light source and splits the light beam into the plurality of light beams such that the light beams having a phase difference of approximately $\mu/2$ are each incident to any one of the reflecting surfaces.

* * * * *